United States Patent [19]
Gore

[11] 3,756,004
[45] Sept. 4, 1973

[54] METHOD AND APPARATUS FOR INSULATING ELECTRICAL CONDUCTORS

[75] Inventor: Wilbert L. Gore, Newark, Del.

[73] Assignee: W. L. Gore & Associates, Inc., Newark, Del.

[22] Filed: Sept. 21, 1970

[21] Appl. No.: 73,769

Related U.S. Application Data

[63] Continuation-in-part of Ser. No. 666,007, Sept. 7, 1967, abandoned.

[52] U.S. Cl. ............................ 57/11, 57/3, 57/160, 156/53, 156/195, 156/425
[51] Int. Cl. ...................... H01b 13/08, B65h 81/00
[58] Field of Search ............... 242/7.21, 7.22, 7.23; 57/11, 10, 3, 13, 160; 156/53, 51, 56, 195, 425, 428, 429

[56] References Cited
UNITED STATES PATENTS

| | | |
|---|---|---|
| 2,253,740 | 8/1941 | Van Hook ............................ 57/3 X |
| 3,379,385 | 4/1968 | Osweiler ............................ 242/7.22 |
| 3,338,527 | 8/1967 | Chidzey ............................ 242/7.22 |
| 2,749,054 | 6/1956 | Crom, Jr. ............................ 242/7.22 |
| 3,221,401 | 12/1965 | Scott et al. ...................... 242/7.23 X |
| 2,525,300 | 10/1950 | Jones ................................. 57/6 X |

*Primary Examiner*—Billy S. Taylor
*Attorney*—C. Walter Mortenson

[57] ABSTRACT

Wire is fed along its longitudinal axis from a supply to a take-up by a power driven capstan. In one embodiment, the capstan, wire supply, and take-up are rotated about the axis of the wire to impart rotation of the wire. Tape is fed through pinch rollers to the advancing and spinning wire and is spirally wrapped around the wire. The tape feed rate is controlled so as to impart constant elongation to the tape by correlating the speed of the tape feed rollers by suitable connecting means with both the rate of rotation and rate of advance of the wire, thereby resulting in uniform insulation thickness on the wire. Alternatively the tape can be rotated about a non-rotating wire.

6 Claims, 9 Drawing Figures

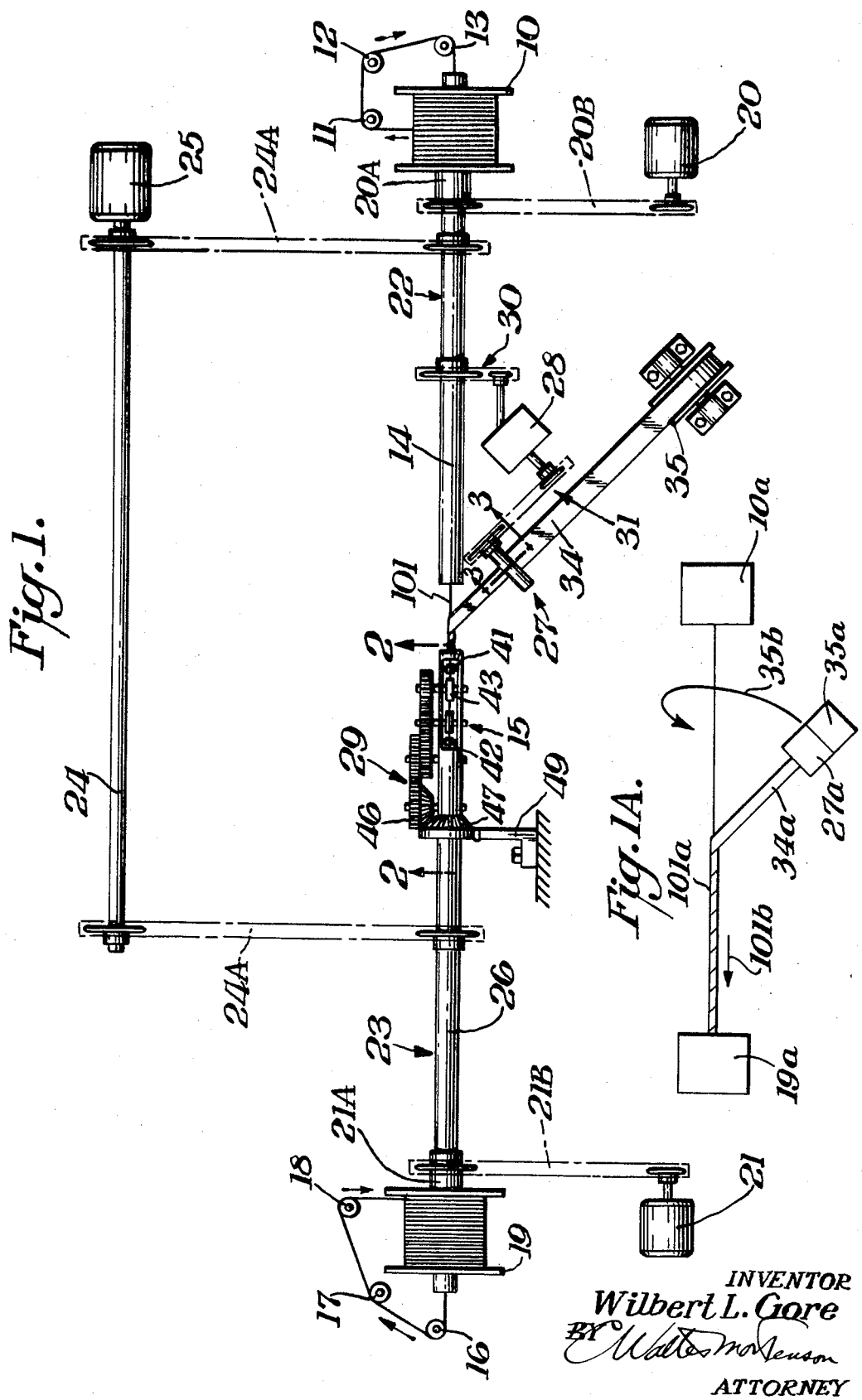

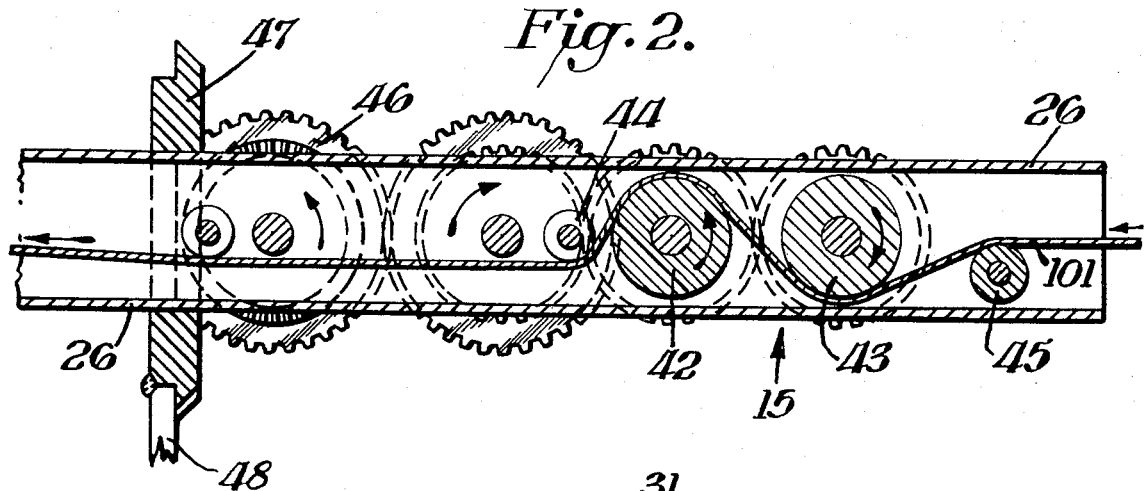
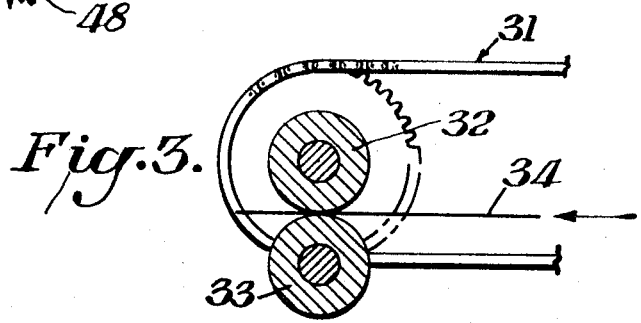
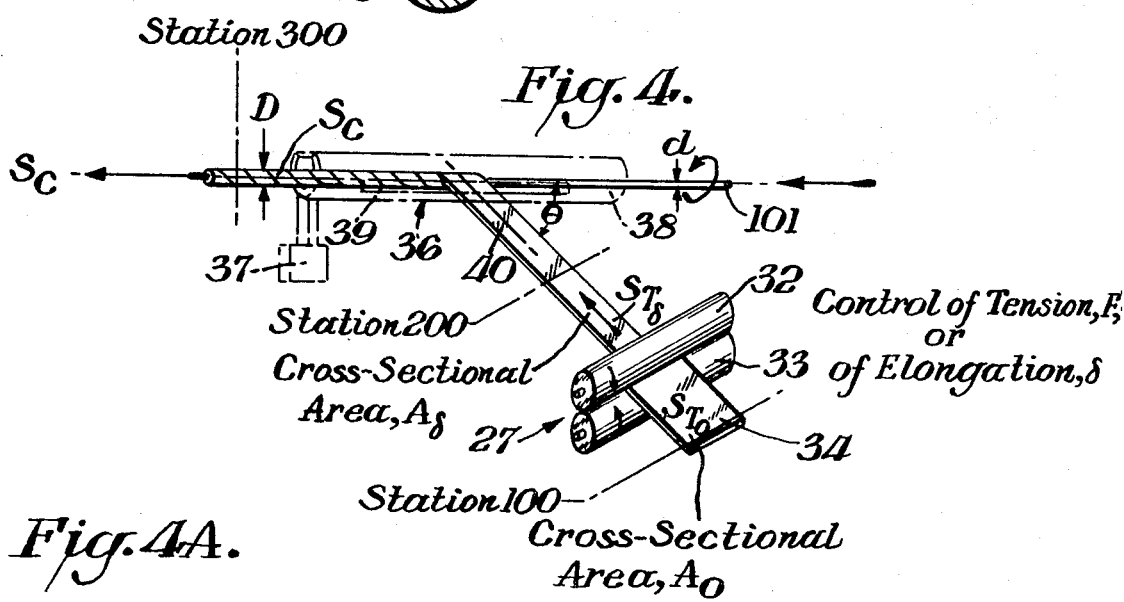
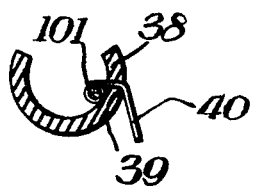

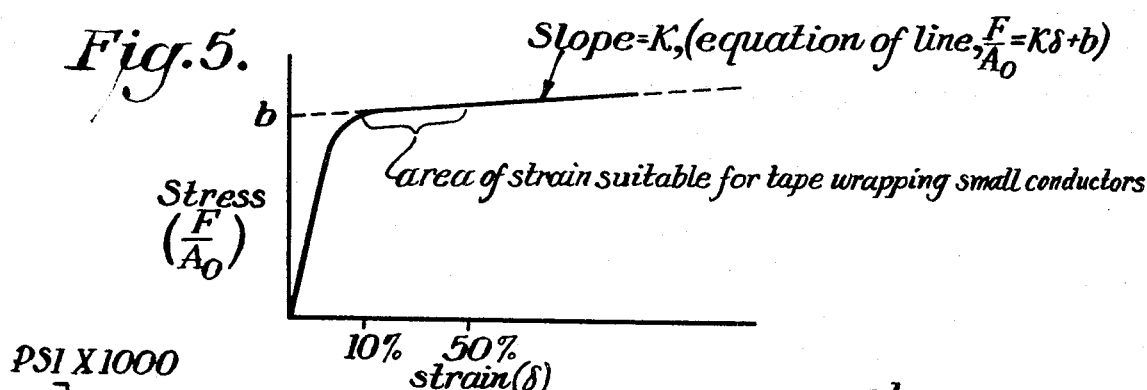
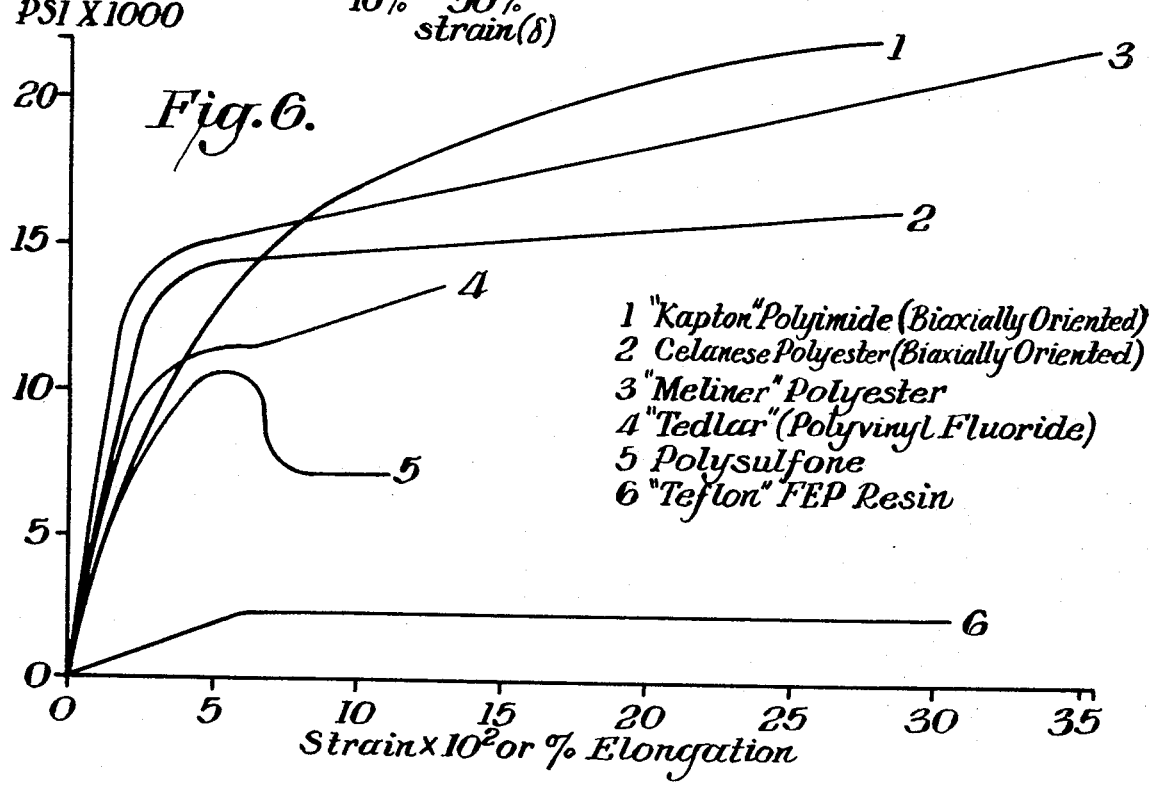
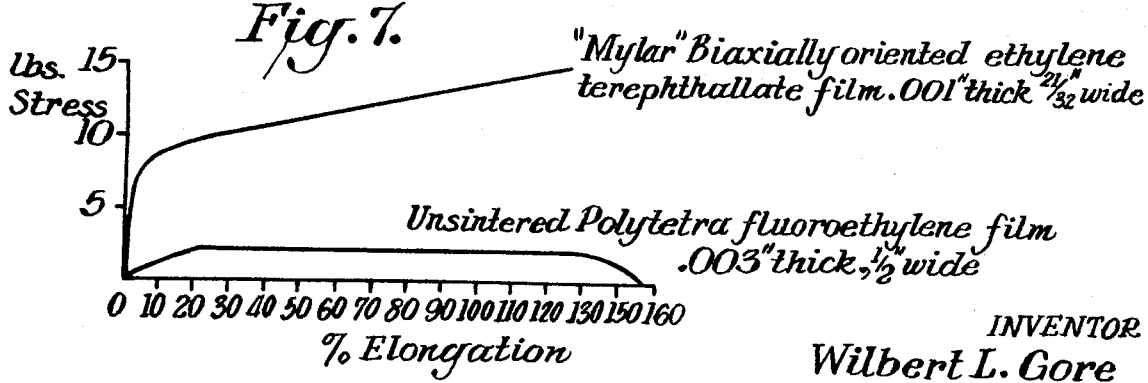

FIG. 6 shows tensile/elongation curves for certain films or tapes; and

FIG. 7 shows similar curves for two films or tapes widely used in tape-wrapping conductors.

Shown in FIG. 1 is a tape-wrapping device in which the wire 101 is rotated and the tape 34 is fed to the spinning wire from a payout 35. The wire is taken off spool 10 over pulleys 11, 12 and 13 which are supported by any suitable conventional means (not shown for convenience) so that they rotate with tube 14 and strung through the hollow tube 14 through capstan 15 and through another set of pulleys 16, 17 and 18 which are supported by any suitable conventional means (not shown for convenience) so that they rotate with tube 26 to the take-up spool 19. Tension is maintained on the wire by a magnetic brake 20 at the wire payout end and also a similar brake 21 at the wire take-up end, brake 20 braking spool 10 through chain 20B acting on spool 10's attached sprocket 20A and brake 21 similarly acting through its chain 21B on the attached sprocket 21A of spool 19, all as shown in FIG. 1. The tension between the two spools 10 and 19 is so balanced by these magnetic brakes so that the wire capstan 15 controls the advancement of the conductor through the device, as described below.

The rotating unit is made up of two sections 22 and 23, one (22) for payout of bare wire and the other (23) for take-up of insulated wire. These are rotated simultaneously from a single drive shaft 24. Spool 10 is mounted on and is free to rotate with respect to tube 14 which is driven by jack shaft 24 which is in turn driven by motor 25. Shaft 24 also drives hollow tube 26 in section 23 through chain drives 24A. Spool 19 is mounted on and is free to rotate with respect to tube 26. Thus, spools 10 and 19 are being rotated on their respective tubular shafts by the advancing wire operating through pulleys 11 and 18, and each is subjected to respective brakes 20 and 21 in a controlled manner.

A power take-off from spinning tube 14 drives a set of pinch rollers 27 through which the tape 34 is fed. The propulsion speed of the pinch rollers can be adjusted by adjustable speed drive 28 so that the rate of movement of the tape relative to that of the wire is perfectly controlled. Since the wire capstan drive 15 and the pinch rollers 27 are driven from the same drive shaft 24, the rates of wire advance per revolution, and of tape feed per revolution are integrated so that they are independent of rotational rate of the apparatus. Therefore, the elongation of the tape 34 between the pinch rollers 27 and the wire is held at a uniform level established through the adjustable speed drive 28. For a given conductor to be produced, the ratio of drive 28 is set to produce the tape elongation needed to get the desired thickness of insulation. Adjustments needed to get the desired amount of movement of the given conductor per revolution are made through change gears 29 as described below with reference to FIG. 2. With the amount of wire advance and the amount of tape feed per revolution of the wire fixed, the tape is uniformly elongated throughout the given run.

The power take-off for the tape feeding comprises timing belt and pulley assembly 30, shown in FIG. 1 and this is connected to adjustable drive 28 which in turn is connected to and activates timing belt pulley assembly 31. Assembly 31 rotates the drive or pinch rolls assembly 27 which is shown in FIG. 3 as rollers 32 and 33. The insulating tape 34 is pulled off spool 35. As can be seen in FIGS. 1 and 4 tape 34 has a smaller width and/or thickness at the exit end of roll assembly 27 than it does at the entrance end. This reduction in cross-sectional area is due to the stretching of the tape. Payout spool 35 is freely rotatable and no substantial tension is applied on tape 34 as it travels to the pinch roller assembly 27.

Shown in FIGS. 4 and 4A but for convenience omitted in FIG. 1 is a stationary guide or support 36 which is fixedly mounted on mount 37. This support comprises a concave element 38 which has in it longitudinal slot 39 through which the elongated tape 40 coming from assembly 27 passes and is then wrapped around the rotating and longitudinally moving wire 101. The support 36 is located so that wire 101 rides on its inner bottom surface and any pulling of the wire 101 toward the pinch roll assembly 27 due to the tension on the tape is offset, the positioning being shown in FIG. 4A.

In order to advance the conductor 101 through the device, capstan assembly 15 is provided, as mentioned above and as shown in FIG. 1 and, in more detail, in FIG. 2. Assembly 15 rotates with tube 26 in section 23 as shown or with tube 14 in section 22. At the end of tube 26 nearest tube 14 is a slot 41 (FIG. 1) which provides access to capstan members 42 and 43. Auxiliary rollers or snubbers 44 and 45 are also contained within tube 26. Rollers 42 and 43 are driven by gear train 29 and rotate in the direction shown by the arrows in FIG. 2 to advance conductor 101 to the left. In order to impart rotation to the initial gear 46 in train 29, stationary gear 47 is provided. This is fixed by mounting 48 and it has a hole in it through which tube 26 is positioned and is rotating. As tube 26 rotates, it carries gear train 29 and hence gear 46 with it. Since the teeth of gear 46 are in meshing contact with the teeth of fixed gear 47, gear 46 rotates as long as it circles around fixed gear 47. Conductor 101 cannot slip on rollers 42 and 43. The forward pull of take-up spool 19 is such that the frictional contact of rolls 42 and 43 with the wire 101 is sufficient to give a positive movement to the wire when the rollers are rotated. Hence, wire 101 is moved through tube 26 to take-up spool 19.

Conductor 101 is allowed to come off spool 10 at the take-off end without any traversing mechanism. However, at the take-up end, spool 19 is equipped to traverse. It and its controlling brake 21 traverse as a unit by a traverse level wind unit not shown for convenience. Thus, the insulated conductor is laid down smoothly on spool 19 without piling up.

In the spinning wire device just described there is considerable operational advantage in maintaining the tape payout mechanism in a stationary position. However, the principle of the elongation control can be adapted to a device in which the tape roll is rotated around a conductor which moves along its axis but does not rotate. The apparatus, process and the products of this alternate embodiment are also within my invention. For example, wire 101a is taken off spool 10a and passed in a nonrotating manner to wind up spool 19a, as shown by arrow 101b. During this passage, tape 34a is passed around the advancing wire 101a by rotating, with conventional rotating mechanics, the pinch rollers 27a and tape supply 35a around advancing wire 101a, as shown by arrow 35b, the tape 34a being fed, of course, at a rate correlated with the rate of advance of the wire and the rate of relative rotation between the wire and the tape source to effect uniform elongation

METHOD AND APPARATUS FOR INSULATING ELECTRICAL CONDUCTORS

This is a continuation-in-part of U.S. Pat. Ser. No. 666,007 filed on Sept. 7, 1967, and now abandoned.

Electrical conductors are usually insulated with dielectric material by extrusion processes where the dielectric material is a thermoplastic which can be melted and then formed around the conductor. In these extrusion processes it is difficult to form the dielectric around the conductor so that dimensions are prefectly constant. The outside diameter of the insulation is likely to be variable and the conductor not perfectly centered in the insulation. Also, there are a number of materials having very desirable properties which are not thermoplastic and cannot be extruded to form electrical insulation around the conductors. Yet a number of nonextrudable materials having very desirable properties for electrical insulation are available in thin films. These materials are used by wrapping them around a metal conductor. In this process the film material is slit to a narrow width and then wrapped spirally around the conductor with overlap in the wrapping so that two or more layers of the film cover the insulated wire. The overlapping layers are usually sealed together by a subsequent heat treatment or other procedure to bind the overlapping film together and make the covering moisture-proof.

In the conventional tape-wrapping process, great precision is required in correlating the rate of movement of the conductor relative to the rotational rate of the wrapping process. Also, a great deal of attention has to be given to providing uniform back-tension on the tape as it is wrapped around the conductor with overlapping layers of the tape. It is necessary that the tape be stretched to draw down snugly against the conductor as well as pass around the larger diameter of the overlap. The constant back-tension on the tape is designed to stretch the tape so that it pulls down snugly against the conductor but not to stretch it so much that thin spots are produced in the tapes so that an inadequate insulation thickness is provided.

In commonly used automatic equipment for interconnecting electric wire for computers and the like and making connections at the terminals, a high degree of uniformity is necessary in the outside diameter of the insulated conductors. This is necessary because the clamps, strippers, and other tools used in the automatic termination equipment require a high degree of precision in the clamping force and in the location of the conductor being attached to the terminal points. Variation in diameters and non-centering of conductors cause costly loss of time and materials in these operations.

Thus, an objective of this invention is the provision of apparatus and methods which overcome the shortcomings of the prior art. Another aim is the provision of apparatus and methods for providing uniform elongation of the tape during the wrapping process. A further goal is the provision of means for controlling the elongation of the tape. A still further object is the provision of a device which allows the control of the elongation of the tape independently of the back-tension and which allows the production of insulated wire products that have uniform outside diameters. These and other aims will appear hereinafter.

The objectives of this invention are accomplished by uniformly elongating the tape during the wrapping process using the apparatus of this invention. The products are tape-wrapped conductors having a new kind of uniformity in their outside diameters not possessed hithertofore by tape wrapped conductors.

One reason that the prior art products are nonuniform in diameters stems from the fact that in most tape wrapping devices the spool of tape is rotated around the conductor and the back-tension is provided by a rotating brake mechanism which operates on the spool holding the tape. As the tape is used, the spool diameter diminishes, and the torque arm becomes shorter, giving an increased tension during the use of a roll of tape. Periodic adjustments are made on the brake tension by the operator of these tape wrappers, but these tension adjustments are made in steps and not in a continuous fashion. Also, in spite of the great attention that has been given to the refinement of the design of the tape payout brake, variability in the tension is to some degree inherent in all of them.

It would seem then that the way to better diameter control is by perfecting a brake mechanism to provide more uniform tension. However, in the usual tape-wrapping device, the brake spins with the wrapping head and is inaccessible when the machine is running. In order to make the brake accessible while the machine was running, a machine was developed in which the wire is not only fed axially but is spun or rotated at the same time. This spinning wire tape wrapper affords the examination of the brake while the machine is running and affords the use of more sophisticated brake designs than would be possible with the usual tape-wrapping brake-controlled machine. However, even when an improved brake is operating well and providing uniform back tension, the outside diameter of the wire varies more than can be accounted for by the variations in tape width and thickness. It then occurred to me that I might avoid abjectionable diameter variation by controlling the feed rate of the tape to the wire independently of the tension on the tape. This was accomplished by feeding the tape through pinch feed rolls, which are mechanically linked to the wire feed mechanism. Surprisingly, wire produced with this device is more uniform in diameter than wire produced with even the most sophisticated brake mechanisms that were tried.

This invention will be further understood by reference to the description, examples and drawings below which are not limitative but are given for illustrative purposes only and the drawings of which are as follows:

FIG. 1 is a side view of the apparatus of this invention;

FIG. 1A is a schematic diagram showing one embodiment of this invention relating to rotating the tape about a non-rotating core.

FIG. 2 is taken on line 2—2 of FIG. 1;

FIG. 3 is taken on line 3-3 of FIG. 1;

FIG. 4 is an enlarged view of the tape feeding to the advancing conductor, and a slotted tube support through which the tape passes just prior to meeting the conductor, and showing certain mathematical symbols used below, FIG. 4A being a cross-sectional view of said support;

FIG. 5 is a stress/strain curve showing an area of strain suitable for tape-wrapping conductors and defining certain terms used in mathematical considerations given below;

to about 0.130 inch at thin areas of the insulated wire. The tape was unwrapped from a thin area of the constant tension product where the outside diameter was down to 0.0195 inch and also from a thick area of the product where the outside diameter was 0.0225 inch. The width of the tape was 0.155 inch where it was removed from the thin section and the width was 0.210 inch where it was removed from the thick section, a very wide variance. Tape was also removed from the constant elongation tape-wrapped product of this invention, and measurements made at various sections along this tape. At all points the width was uniform between 0.190 and 0.195 inch.

Therefore, the control of elongation of the "MYLAR" tape during tape-wrapping maintains a constant tape width so that exactly four wraps (and 75 percent overlap) can be held, whereas the constant tension process produces variable stretch of the tape, causing it to be narrow in some spots, wide in others with consequent variation in the overlap and in the outside diameter of the insulated wire. Uniform width of tape, it appears, can be maintained with "MYLAR" only when the elongation of the tape is held constant.

With the results of the above examples in mind and upon reflection, it can be seen that the stress-strain characteristics of films impose a limit on the uniformity of insulated wire that can be produced with a controlled tension tape feed. The difficulty is that the stress-strain relationship of some films rises rather quickly to a maximum strain as the material is stretched and then further strain produces little or no increase in tension. Put another way, beyond the yield point the elongation of many films is extremely sensitive to variations in stress. During wrapping, not all variations in the elongation are caused by variations in clutch tension. Small variations in the width and thickness of tape also cause variations in the amount of elongation. In addition, the stress-strain characteristics of the film change along the length of the tape due to changes in temperature, balance of orientation, etc., so that even a tape that is perfectly uniform in width, and perfectly uniform in thickness, and is wrapped with perfectly uniform tension, may produce a wire with substantial variations in diameters. Because real films are not perfect, they are subject to all of these variations. The controlled elongation device of this invention minimizes, or completely eliminates, the effect of these variables on the diameter of the insulated wire.

It turns out that controlled tension wrapping and controlled elongation wrapping can be compared by the well-known mathematical method for analysis of small errors. The analysis determines the variation of wire diameter that is caused by small changes in the cross-sectional area of the tape, $A_o$, by small changes in the strength of the tape, which is characterized by "b" in the stress-strain relationship, and by small changes in the ratio of stress and strain, which is characterized by "K," the slope of stress-strain relationship. The general mathematical statement of the variation of wire diameter, D, with respect to small changes of the variables $A_o$, b, and K is:

$$dD = (\delta D/\delta A_o)dA_o + (\delta D/\delta b) \, db + (\delta D/\delta K) \, dK \tag{1}$$

Nomenclature is listed below. These symbols are further defined in FIGS. 4 and 5.

A = cross-sectional area of tape (length$^2$)
b = intercept on stress axis of linear approximation of stress-strain relationship (force/unit area)
D = diameter of insulated wire (length)
d = diameter of conductor (length) or differential operator depending on context
F = tension on tape during wrapping (force)
K = slope of stress-strain curve (force/unit area)
t = thickness of tape (length)
w = width of tape (length)
s = speed (length/unit time)
$\rho$ = density of insulating material (mass/unit volume)
$\delta$ = strain (length stretched/original length of tape)
74 = wrap angle of tape subscripts:
o = condition when = O (original unstretched condition)
$\delta$ = condition when = $\delta$ = $\delta$
T = refers to tape
c = refers to the conductor Refer to FIG. 4 for the following development. Under steady conditions, the mass of insulation passing station 300 per unit time must equal the mass of insulation passing station 100 per unit time, i.e., the mass of insulation on the wire must be equal to the mass of tape applied from station 200

$$\rho \, \delta \, [(\pi/4) \, (D^2 - d^2)]S_c = \rho_o \, A_o \, S_{T_o} \tag{2}$$

or by rearranging, $$\rho \, \delta \, [(\pi/4) \, (D^2 - d^2)] = \rho_o \, A_o \, (S_{T_o}/S_c)$$

Also from the definition of strain, $\delta$, we have the following relationship:

$$(S_T \, /S_{T_o}) - 1 = \delta \text{ or } (S_T \, /S_{T_o}) = \delta + 1 \tag{3}$$

and from geometry it can be seen that $$S_T = S_c/\cos\theta \tag{4}$$

If equations (3) and (4) are combined to eliminate "$S_T$," the ratio $S_T \, /S_{T_o}$ can be solved for and substituted into equation (2). The resulting equation is $$\rho \, \delta \, [(\pi/4) \, (D^2 - d^2)] = \rho_o \, A_o/(\delta + 1)\cos\theta \tag{5}$$

Equation (5) can be used for calculations involving strain since "$\delta$" appears explicitly. For calculations involving tension, F, equation (5) can be made explicit in "F" from the stress-strain relation of the tape.

The general linearized form of the stress-strain relationship is (see FIG. 5)

$$F/A_o = K \, \delta + b \tag{6}$$

If one solves for "$\delta$" in equation (6) and substitutes the results into equation (5), one obtains the following $$\rho_o\left[\frac{\pi}{4}(D^2 - d^2)\right] = \frac{\rho_o A_o}{\left[\dfrac{F}{KA_o} - \dfrac{b}{K} + 1\right] \cos\theta} \tag{7}$$

resulting in uniform covering thickness along the length of the wire.

EXAMPLE I

This experiment demonstrates the constant tension process and products therefrom are described.

A magnetic brake was coupled to the pinch feed rolls of the spinning wire tape-wrapper in place of the power take-off 30 and adjustable drive 28. An AWG 30 wire 0.010 inch in diameter was placed on the payout spool 10 and strung through the wire-feed capstan 15 and onto the take-up spool 19. A "MYLAR" biaxially oriented polyethyleneterephthalate film 0.001 inch thick (coated with adhesive to a total nominal thickness of 0.0015 inch) slit to seven thirty-secondths inch width, was placed on the tape payout 35, passed through the pinch rolls 27 and attached around the wire ("MYLAR" being a trademark of E. I. duPont de Nemours & Co., Inc.). The wire was then rotated with the capstan adjusted so that the movement per revolution of the wire along its axis gave a 75 percent overlap, thus giving four layers of material over the wire. The magnetic brake coupled to the pinch rollers 27 was adjusted to exactly 3.0 lbs. tension on the tape. This was just sufficient to draw it down snugly against the bare wire 101 in the section at the point of application where there was no overlap. About 1,000 feet of wire was insulated with the four overlaps of film and the tension on the tapes through the pinch rolls again checked. It was still exactly 3.0 lbs. The outside diameter of the wire was carefully measured at intervals of approximately 20 feet along the length. The frequency distribution of these measurements is given in column A of Table I below. The product does not have the uniformity of the products of this invention.

EXAMPLE II

This example demonstrates the exceptional results obtained by this invention.

The magnetic brake used in Example I was removed from the pinch rolls, and the power take-off 30 and adjustable speed drive 28 were attached as shown in FIG. 1 so that the rotation of the pinch rolls 27 was coupled to or integrated with the rotation of the wire. The same spool of wire and roll of tape used in Example I were left on the tape-wrapping machine. The wire was again rotated and the adjustable drive 28 was adjusted so that the elongation of the tape was uniform and just sufficient to draw the tape snugly against the bare wire at the point of application. Approximately 1,000 feet of wire were insulated with four layers of the tape. The outside diameter of the wire was carefully measured at intervals of approximately 20 feet along the length of the wire. The frequency distribution of these measurements is shown in column B of Table I.

TABLE I

FREQUENCY DISTRIBUTIONS

AWG 30 Wire (conductor O.D. = 0.010'')

| | Example I<br>Column A<br>Tension Control<br>N | Example II<br>Column B<br>Elongation Control<br>N |
|---|---|---|
| 0.0230–0.0234 in. | 1 | 0 |
| 0.0225–0.0229 in. | 4 | 0 |
| 0.0220–0.0224 in. | 10 | 2 |
| 0.0215–0.0219 in. | 12 | 10 |
| 0.0210–0.0214 in. | 11 | 27 |
| 0.0205–0.0209 in. | 13 | 7 |
| 0.0200–0.0204 in. | 7 | 1 |
| 0.0195 0.0199 in. | 5 | 0 |
| 0.0190–0.0194 in. | 2 | 0 |
| Total: | 65 | Total: 47 |

$\bar{x} = .0212''$  $\bar{x} = .0215''$
s.d. $= .00093''$  s.d. $= .00039''$
$F = (0.00093)^2/(0.00039)^2 = 5.7$
$F\ 0.01 = 2.0$ The standard deviation (s.d.) of outside diameter measurements for the wire produced in this example by the constant elongation process of this invention was 0.00039 inch. This is much lower than the 0.00093 inch standard deviation of the measurements made on the outside diameter of wire produced by the constant tension process of Example I. The "F" ratio of the two variances is 5.7, greatly exceeding the 2.0 "F" ratio expected at a probability of 0.01. The insulated conductor produced by this invention is far superior in uniformity of diameter.

EXAMPLE III

This example illustrates the results which are obtained when using the conventional controlled tension process which does not employ a rotating wire.

The same spool of wire used in the two previous examples and a roll of coated "MYLAR" tape slit to the same width from the same large roll were then placed on a conventional tape-wrapper where the tape spool is rotated around the wire. About 1,000 feet of insulated wire was produced, making an initial adjustment on the tape-feed clutch to bring the tape snugly against the bare wire, and then running the machine smoothly at a uniform rate with no further adjustments. A tensionmeter reading of the back-tension of the tape gave a value of 3.1 lbs. at the beginning of the run and 3.3 lbs. at the end of the run.

52 outside diameter readings made about every 20 feet along the length of wire gave an average diameter of 0.0199 inch with a standard deviation of 0.00121. A series of thickness measurements were made on the residual tape on the roll by stacking 10 layers of the tape and measuring the thickness of the stack. These varied from 0.0152 inch to 0.0156 inch. Measurements made of a single thickness of tape gave a range from 0.0014 inch to 0.0017 inch.

An analysis indicates that the diameter variations are substantially greater than can be accounted for by the variations in tape thickness.

EXAMPLE IV

This example compares the elongation effects on the insulating tape by constant-tension wrapping versus the constant-elongation wrapping by this invention.

A length of coated "MYLAR" 0.0015 inch thick, seven thirty-secondths inch wide was marked on one edge with an ink dot every 0.1 inch along the length. Part of this material was wrapped on AWG 30 wire using the constant-tension wrapper as in Example I and part was wrapped on the constant elongation tape-wrapper of this invention as in Example II, the wire being rotated in each instance. The spacing of the dots was then measured on the resultant wrapped wires.

This spacing was very uniform about 0.115 inch on the insulated wire produced by the elongation-control device of this invention. However, the spacing of the dots varied from about 0.105 inch at thick areas of the insulated wire from the constant tension tape-wrapper Usually $\rho_s = \rho_o$, i.e., straining the tape does not appreciably affect its density, and equation (7) then becomes $$\left[\frac{\pi}{4}(D^2 - d^2)\right] = \frac{A_o}{\left[\frac{F}{KA_o} - \frac{b}{K} + 1\right]\cos\theta} \quad (8)$$

The partial derivatives in equation (1) can be evaluated from equation (8) for the case of constant elongation $\delta$ = constant $$\left(\frac{\partial D}{\partial A_o}\right)_{\delta=\text{constant}} = \frac{2}{\pi D\left[\frac{F}{KA_o} - \frac{b}{K} + 1\right]\cos\theta} \quad (9)$$

$$(\delta D/\delta b)_\delta = \text{constant} = 0 \quad (10)$$

$$(\delta D/\delta K)_\delta = \text{constant} = 0 \quad (11)$$

Similarly, the derivatives in equation (1) can be evaluated from equation (8) for the case of constant tension, F=constant $$\left(\frac{\partial D}{\partial A_o}\right)_{F=\text{constant}} = \frac{2}{\pi D\left[\frac{F}{KA_o} - \frac{b}{K} + 1\right]\cos\theta} + \frac{2\left[\frac{F}{KA_o}\right]}{\pi D\left[\frac{F}{KA_o} - \frac{b}{K} + 1\right]^2\cos\theta} \quad (12)$$

$$\left(\frac{\partial D}{\partial b}\right)_{F=\text{constant}} = \frac{2A_o}{\pi DK\left[\frac{F}{KA_o} - \frac{b}{K} + 1\right]^2\cos\theta} \quad (13)$$

$$\left(\frac{\partial D}{\partial K}\right)_{F=\text{constant}} = \frac{2A_o\left[\frac{F}{KA_o} - \frac{b}{K}\right]}{\pi DK\left[\frac{F}{KA_o} - \frac{b}{K} + 1\right]^2\cos\theta} \quad (14)$$

The stress-strain relationships for several commercially available films are plotted in FIG. 6. These plots provide the necessary numerical data for Table II. The values for all films are evaluated in the area of $\delta = 0.1$, which is generally found to be the minimum amount of stretch that is needed for wrapping small conductors. Each of the variables ($A_o$, $b$, $K$) will be examined separately for a specific case in the following numerical examples to determine their effect on the diameter.

TABLE II

| Material* | K(psi) | b(psi) | F/KA$_o$ |
|---|---|---|---|
| (1) MYLAR (DuPont polyester) | 13,500 | 13,700 | 1.115 |
| (2) CELANAR (Celanese polyester) | 7,420 | 14,000 | 1.95 |
| (3) ICI polyester (MELINEX) | 22,000 | 14,000 | 0.728 |
| (4) TEDLAR (DuPont polyvinyldiene fluoride) | 63,000 | 10,000 | 0.200 |
| (5) Polysulfone (Union Carbide) | 0 | 7,200 | |
| (6) Unsintered polytetrafluorotethylene | 7,500 | 0 | 0.100 |
| (7) FEP TEFLON (DuPont) | 1.5 | 1,900 | 1.330 |
| (8) KAPTON polyimide (DuPont) | 32,400 | 14,000 | 0.525 |

* The quoted items are believed to be trademarked as indicated by the respective companies.

EXAMPLE V

Variations of Diameter Caused by Variations in Tape Thickness: A Comparison of Controlled Tension vs. Controlled Elongation Wrapping for "MYLAR."

Under consideration is a construction for which $d$ = 0.010 inch, $D$ = 0.195 inch, and $\theta$ = 15°. This construction is currently being supplied for use in an automatic termination device. The tape used is seven thirty-seconds inch wide and is 0.00157 inch thick (about 0.001 inch "MYLAR" plus 0.00057 inch adhesive).

In determining the effect on D of small variations of tape thickness or cross-sectional area, the incremental variation of area, $\Delta A_o$, is substituted for the infinitesimal variation, $dA_o$, which appears in equation (1). Similar substitutions are made in examples VI and VII for the infinitesimal variations "$db$" and "$dk$."

Consider a variation in the thickness of the "MYLAR" of ± 0.0001 inch. The total variation of tape thickness is $\Delta t_o$ = 0.0002 inch, and the variation of the cross-sectional area of the tape is $\Delta A_o$ = (7/32) × (0.0002) = 4.38 × 10$^{-5}$ in.$^2$ From Table II the following values are obtained for "MYLAR":

$$F/KA_o = 1.115; \quad b/K = 1.015$$

By substituting these values into equation (12), we obtain the value for the partial differential in the first term of equation (1), $(\delta D/\delta A_o)_{F=constant}$ = 62.0. The variation in diameter that results from controlled tension wrapping then is found to be $$\Delta D = (\delta D/\delta A_o)_{F=constant} \Delta A_o = 62.0 \,(4.38 \times 10^{-5})$$
$$= 0.00272 \text{ inch}$$

Similarly from equation (9) one obtains the variation in diameter that results from controlled elongation wrapping:

$$\Delta D = (\delta D/\delta A_o)_{=constant} \Delta A_o = 0.00136 \text{ inch}$$

Thus, the variation in diameter of the wire wrapped with controlled elongation is only about half as great as with controlled tension. It should be noted that "MYLAR" is not the most sensitive film to variations of this sort. For example, both the FEP-"TEFLON" and "CELANAR" polyester show greater differences.

EXAMPLE VI

Variations of Diameter Caused by Variations in Film Strength; A Comparison of Controlled Tension vs. Controlled Elongation Wrapping for "MYLAR."

We will now consider how changes in film strength affect the diameter. The same wire construction is considered as in the previous example: i.e., $d$ = 0.010 inch, $D$ = 0.0195 inch, $\theta$ = 15°, $t_o$ = 0.00157 inch, $w_o$ = 7/32 inch, $F/KA_o$ = 1.115, $b/K$ = 1.015.

Consider a 10 percent change in "$b$" (which corresponds, for example, to about a 10° C. change in film temperature for "MYLAR").

$$\Delta b = 0.1 \ (13,700) = 1,370$$

By substituting these values in equation (13), to evaluate the second term of equation (1), one obtains the variation in diameter for controlled tension wrapping, which is $\Delta D_{(F=constant)} = ([\delta D]/[\delta b])_{F=constant} \Delta b = 0.000981$ inch For controlled elongation wrapping there is no effect on the diameter as can be seen from equation (10).

$$\Delta D_{(\epsilon=constant)} = 0$$

EXAMPLE VII

Variations of Diameter Caused by Variations in Degree and Balance of Film Orientation: A Comparison of Controlled Tension vs. Controlled Elongation Wrapping for "MYLAR."

Many films, such as "MYLAR," owe their good physical properties to biaxial orientation of the film, which is accomplished by stretching the film both transversely and longitudinally during manufacture of the film. The slope, K, of the stress-strain curve is greatly affected by the balance of transverse and longitudinal properties established by this process.

Apparently, the biaxial orientation of film is not an easy process for the manufacuturer to control. For example, some published stress-strain curves for "MYLAR" (DuPont Bulletin M–2C) show that "K" may become zero or even negative in the region of $0.07 < \delta < 0.18$. Under these conditions such large variations in diameter occur with controlled tension wrapping that the method used to analyze small errors no longer applies.

Considering here a variation in "K" of only $\pm$ 10 percent, then $\Delta K = 0.2 \ (13,500) = 2,700$ psi. By substituting these values into equation (14), the third term of equation (1) then gives the variation in diameter for controlled tension wrapping, which is $$\Delta D_{(F=constant)} = (\delta D/\delta K)_{F=constant} \Delta K = 0.0002 \text{ inch}$$

For controlled elongation wrapping there is no effect on the diameter as can be seen from equation (11):

$$\Delta D(\delta = \text{constant}) = 0$$

While this invention has been described with reference to certain films, one skilled in the art will easily recognize that the principles of this invention are applicable to many more polymeric films that exhibit small slopes in their stress-strain curves at strains near about 10 percent and preferably in the area of strain from about 5 percent to about 50 percent. Those films or tapes mentioned herein are representative of such tapes and of tapes that are presently in commercial use. The polymeric tapes may be made of such polymers as polytetrafluoroethylene or copolymers of tetrafluoroethylene with other unsaturates as ethylene and fluorinated propylenes such as hexafluoropropylene as well as poly(chlorotrifluoroethylene), poly(ethyleneterephthalate) and other polyesters, various polyimides, polyvinyl fluoride, among others. Also, one skilled in the art will appreciate that the tapes from such polymers may be of different thicknesses than those given in the examples. Generally, tapes more than 0.005 inch thick are not used in spirally wrapping small conductors though they may be if desired and this invention is applicable to such thicker tapes. The unwrapped conductors used are uniform in diameter along their lengths generally varying only about $\pm$ 0.0002 inch. Conductors may be employed that have larger or smaller diameters than the 0.010 inch wire used in the examples.

Further, one skilled in the art may wish to employ mechanical equivalents for the various mechanical elements in the apparatus of this invention, and this may be done without departing from the principles of this invention. For example, instead of driving the means for advancing the conductor, the means for advancing the tape and the means for effecting relative rotation from the same source, one could drive these separately using synchronous motors and by making the adjustments described herein could effect the means for controlling the elongation to elongate it uniformly as it is being passed to the advancing conductor and as it is being spirally wound on said conductor. One may use other braking means besides the magnetic brakes used on the wire payout and take-up, and if desired the amount of braking may be changed during a given run though normally this is not necessary. While a driven capstan or other equivalents can be used for advancing the tape, generally the pinch roller assembly is used. In the embodiment of this invention in which the wire is rotated any means that applies the required friction as an advancing force to said conductor such as the described capstan assembly, may be used. In the given capstan assembly the rollers are usually grooved though they need not be. Thus, to obtain the spirally wrapped products of this invention, one selects a tape which can be stretched and with an apparatus of this invention and while applying the principles of this invention, he elongates the tape uniformly at a chosen value within the preferred area of strain as he effects the spirally wrapping on the chosen conductor to produce the desired number of overlaps. The uniform elongation effected as the spiral wrapping is being produced leads to insulated conductors having exceptionally uniform outside diameters.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. A process for producing a uniform covering on a core by spirally wrapping the covering on the core, which wrapping process comprises:
   a. advancing the core at a rate, and
   b. feeding the covering material in tape form to the advancing core from a non-advancing source, which source comprises a conventional tape supply and a device for feeding said tape at a metered rate, and
   c. maintaining relative rotation between said advancing core and said tape source, and
   d. metering the rate of feed of said tape such that said rate of feed of said tape is correlated with both the rate of advance of the core and the rate of relative rotation between the core and the tape source thereby providing uniform elongation of the tape resulting in uniform covering thickness along the length of the core.

2. A process in accordance with claim 1 in which said core is an electrical conductor.

3. A process in accordance with claim 1 in which said tape source is rotating around said non-rotating core.

4. Apparatus for producing a uniform, spirally tape wrapped covering on a core comprising
   a. means for advancing the core at a rate, and
   b. means for feeding the covering material in tape form at a metered rate to the advancing core which means comprises a conventional tape supply and a device for feeding said tape at a metered rate, and
   c. means for maintaining relative rotation between the advancing core and the non-advancing tape-feeding means, and
   d. means for correlating the metered rate of tape feeding with both the rate of advance of the core and the rate of relative rotation between the core and the tape-feeding means, thereby uniformly elongating said tape as it is being fed to said core.

5. Apparatus in accordance with claim 4 in which said core comprises an electrical conductor.

6. Apparatus in accordance with claim 4 in which said device for feeding the tape comprises a set of pinch rollers.

* * * * *

UNITED STATES PATENT OFFICE
CERTIFICATE OF CORRECTION

Patent No. 3,756,004　　　　　　　　Dated September 4, 1973

Inventor(s) Wilbert L. Gore

It is certified that error appears in the above-identified patent and that said Letters Patent are hereby corrected as shown below:

On the cover sheet [73] Assignee: "W. L. Gare & Associates, Inc." should read -- W. L. Gore & Associates, Inc. --. Column 2, line 38, "aBjectionable" should read -- objectionalbe --. Column 7, line 63, in the equation, "$\delta$" should read -- $\alpha$ --. Column 8, line 14, "74" should read -- $\theta$ --; lines 26 and 31, "$\rho\delta$" should read -- $\rho_\delta$ --; line 36, two places and line 41, one place, and line 45, two places, "$S_T$" should read -- $S_{T\delta}$ -- in all five places. line 47, "$\rho^\delta$" should read -- $\rho_\delta$ --; line 66, "$\rho s$" should read -- $\rho\delta$ --. Column 9, line 1, "$\rho s$" should read -- $\rho\delta$ --; line 15, the left-hand portion of the equation should appear as shown below:

$$\left(\frac{\alpha D}{\alpha A_0}\right)_{\delta=constant}$$

line 20, "$(\delta D/\delta b)_{\delta=constant} = 0$" should read

-- $(\alpha D/\alpha b)_{\delta=constant} = 0$ --; line 25, "$(\delta D/\delta K)_{\delta=constant} = 0$" should read -- $(\alpha D/\alpha K)_{\delta=constant} = 0$ --.

UNITED STATES PATENT OFFICE
CERTIFICATE OF CORRECTION

Patent No. 3,756,004     Dated September 4, 1973

Inventor(s) Wilbert L. Gore     Page - 2

It is certified that error appears in the above-identified patent and that said Letters Patent are hereby corrected as shown below:

line 31, the left-hand portion of the equation should appear as shown below:

$$\left(\frac{\alpha D}{\alpha A_o}\right)_{F=constant}$$

Column 10, line 37, two places and line 41, two places, "$\delta$" should read --$\alpha$--, in all four places; line 47, "$(\delta D/\delta A_o)_{=constant}$" should read -- $(\alpha D/\alpha A_o)_{\delta=constant}$ --.

Column 11, line 6, "$([\delta D]/[\delta b])$" should read -- $(\alpha D/\alpha b)$ --; line 11, "$(=constant)$" should read -- $(\delta =constant)$ --; line 42, "$\delta$", both occurrence, should read -- $\alpha$ --.

Signed and sealed this 3rd day of September 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

Patent No. 3,756,004          Dated September 4, 1973

Inventor(s) Wilbert L. Gore

It is certified that error appears in the above-identified patent and that said Letters Patent are hereby corrected as shown below:

On the cover sheet [73] Assignee: "W. L. Gare & Associates, Inc." should read -- W. L. Gore & Associates, Inc. --. Column 2, line 38, "aBjectionable" should read -- objectionable --. Column 7, line 63, in the equation, "$\delta$" should read -- $\partial$ --. Column 8, line 14, "74" should read -- $\theta$ --; lines 26 and 31, "$\rho\delta$" should read -- $\rho_\delta$ --; line 36, two places and line 41, one place, and line 45, two places, "$S_T$" should read -- $S_{T\delta}$ -- in all five places. line 47, "$\rho^\delta$" should read -- $\rho_\delta$ --; line 66, "$\rho_\delta$" should read -- $\mathcal{P}_\delta$ --. Column 9, line 1, "$\rho_\delta$" should read -- $\mathcal{P}_\delta$ --; line 15, the left-hand portion of the equation should appear as shown below:

$$\left(\frac{\partial D}{\partial A_0}\right)_{\delta=\text{constant}}$$

line 20, "$(\delta D/\delta b)_{\delta=\text{constant}}=0$" should read -- $(\partial D/\partial b)_{\delta=\text{constant}}=0$ --; line 25, "$(\delta D/\delta K)_{\delta=\text{constant}}=0$" should read -- $(\partial D/\partial K)_{\delta=\text{constant}}=0$ --.

UNITED STATES PATENT OFFICE
CERTIFICATE OF CORRECTION

Patent No. 3,756,004      Dated September 4, 1973

Inventor(s) Wilbert L. Gore      Page - 2

It is certified that error appears in the above-identified patent and that said Letters Patent are hereby corrected as shown below:

line 31, the left-hand portion of the equation should appear as shown below:

$$\left(\frac{\partial D}{\partial A_o}\right)_{F=constant}$$

Column 10, line 37, two places and line 41, two places, "$\delta$" should read --$\partial$--, in all four places; line 47, "$(\delta D/\delta A_o)_{=constant}$" should read -- $(\partial D/\partial A_o)_{\delta=constant}$ --.

Column 11, line 6, "$([\delta D]/[\delta b])$" should read -- $(\partial D/\partial b)$ --; line 11, "( =constant)" should read -- ($\delta$ =constant) --; line 42, "$\delta$", both occurrence, should read -- $\partial$ --.

This certificate supersedes Certificate of Correction issued Sept. 3, 1974.

Signed and sealed this 3rd day of June 1975.

(SEAL)
Attest:

RUTH C. MASON
Attesting Officer

C. MARSHALL DANN
Commissioner of Patents
and Trademarks